United States Patent
Bowers et al.

(10) Patent No.: US 7,751,839 B2
(45) Date of Patent: Jul. 6, 2010

(54) METHOD AND SYSTEM FOR BANDWIDTH OPTIMIZATION IN A COMMUNICATION NETWORK

(75) Inventors: Jason S. Bowers, Aurora, CO (US); Jonathan H. Gross, Gilbert, AZ (US)

(73) Assignee: Motorola, Inc., Schaumburg, IL (US)

(*) Notice: Subject to any disclaimer, the term of this patent is extended or adjusted under 35 U.S.C. 154(b) by 474 days.

(21) Appl. No.: 11/936,902

(22) Filed: Nov. 8, 2007

(65) Prior Publication Data
US 2009/0124275 A1    May 14, 2009

(51) Int. Cl.
*H04Q 7/22*     (2006.01)

(52) U.S. Cl. .................. 455/509; 455/450; 455/453; 455/452.1

(58) Field of Classification Search ............ 455/509, 455/450, 453, 452.1, 513, 62, 522, 69, 524, 455/525, 134, 135, 138, 177.1, 420, 428, 455/436, 439, 443, 464; 370/209, 338, 345; 709/205

See application file for complete search history.

(56) References Cited

U.S. PATENT DOCUMENTS

| | | | | |
|---|---|---|---|---|
| 6,449,290 | B1 * | 9/2002 | Willars et al. | 370/507 |
| RE41,000 | E * | 11/2009 | Willars et al. | 370/507 |
| 2002/0183066 | A1 * | 12/2002 | Pankaj | 455/453 |
| 2003/0054773 | A1 * | 3/2003 | Vanghi | 455/70 |
| 2007/0197223 | A1 * | 8/2007 | Jung et al. | 455/436 |
| 2007/0270146 | A1 * | 11/2007 | Suzuki et al. | 455/436 |

* cited by examiner

*Primary Examiner*—Tan Trinh

(57) ABSTRACT

A method for the bandwidth optimization of at least one sector in a communication network is provided. The communication network comprises at least one mobile device (106) and a base station controller (102). A Data Rate Control (DRC) cover value of a first mobile device (106) is set for a first sector. The method includes comparing a number of active users of the first sector with a threshold bandwidth when a DRC of the first sector is in lock for the first mobile device. Further, a second sector with available bandwidth and a DRC in lock for the first mobile device (106) is searched, when the number of active users of the first sector is greater than the threshold bandwidth. Furthermore, the first mobile device (106) is removed from the first sector and redirected to the second sector when the second sector exists.

19 Claims, 5 Drawing Sheets

METHOD AND SYSTEM FOR BANDWIDTH OPTIMIZATION IN A COMMUNICATION NETWORK

FIELD OF THE INVENTION

The present invention relates in general to communication networks, and more specifically, to a method and system for bandwidth optimization in a communication network.

BACKGROUND OF THE INVENTION

In a communication network, a mobile device communicates with other mobile devices through various Base Transceiver Stations (BTSs). A BTS is an equipment that receives data from one mobile device and transmits it to another mobile device, thereby facilitating the communication between them. Each BTS serves a pre-defined geographical area, which is divided into smaller areas called sectors. Therefore, each sector covers a geographic area and is identified by a unique identifier. This unique identifier can be a unique name assigned to each of the sectors. The mobile device can select a suitable sector within its geographic vicinity and establish a communication link with the BTS of the selected sector. The link then facilitates the communication between the mobile device and other mobile devices. A base station controller controls and monitors various BTSs and mobile devices and helps in the selection of a suitable sector.

The process of selecting a sector depends on the signal strength the sector provides to the mobile device. The Data Rate Control (DRC) value of the sector is a measure of the strength of the forward link. The strength of the forward link relates to the data rate that can be supported by the current Radio Frequency (RF) conditions of the communication link between the mobile device and the BTS of the sector. The mobile device selects the sector that has the highest DRC value. The selected sector transmits the data on the forward link.

When the BTS is serving a relatively high number of active mobile devices, there can be a situation when the bandwidth available at some mobile devices is less then what is required for smooth communication with these mobile devices. Low bandwidth availability at the mobile device results in a low data throughput on the forward link. As a result, the mobile device may be served by a sector that provides maximum signal strength, but a poor quality of communication. There may be other sectors in the network that are capable of serving the mobile device with higher throughput at lower signal strength. However, these sectors are not selected due to the maximum signal strength criterion.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
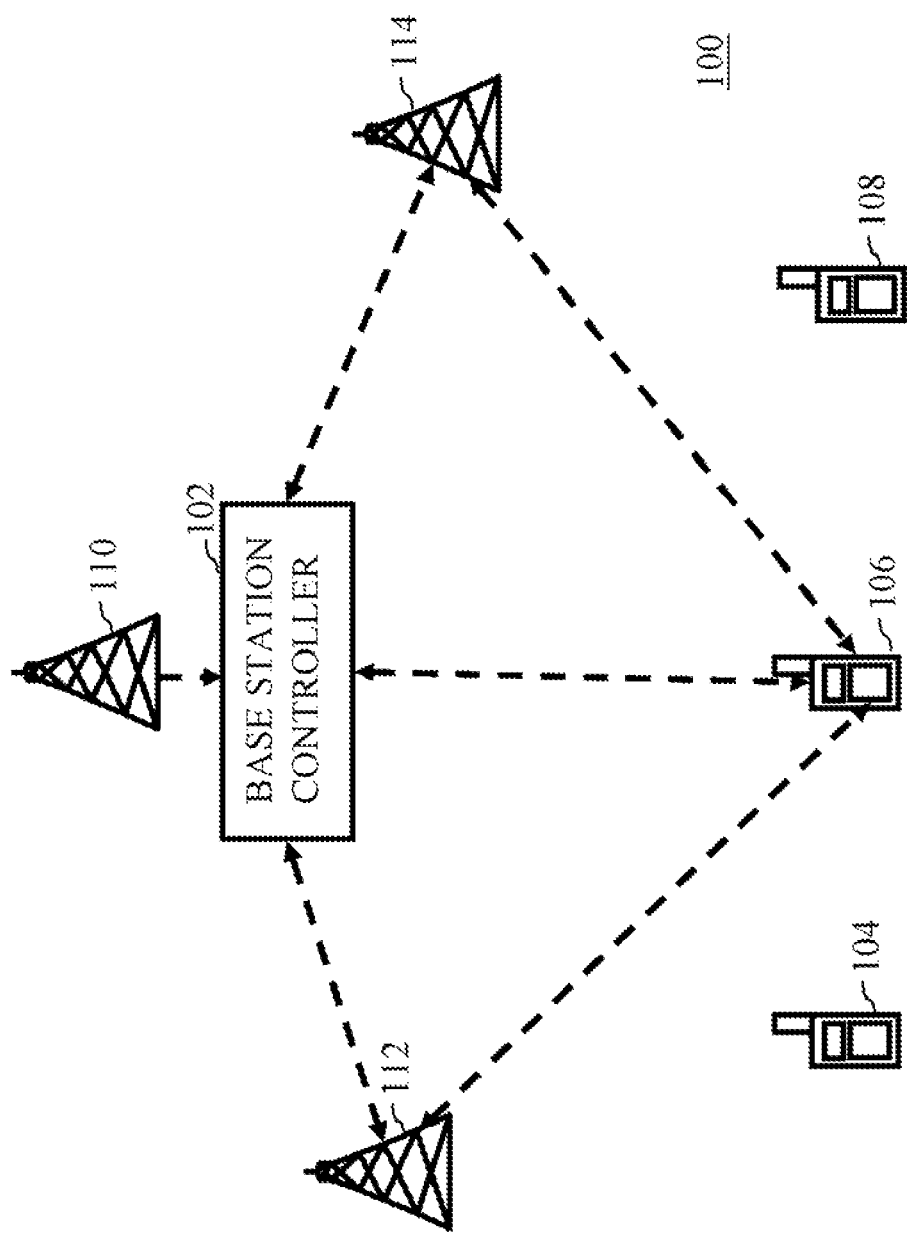
FIG. 1 illustrates a communication network, wherein various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION OF THE EMBODIMENTS

Before describing in detail the particular method and system for bandwidth optimization in a communication network, in accordance with the present invention, it should be observed that the present invention utilizes a combination of method steps and apparatus components that are related to the method and system for bandwidth optimization in the communication network. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising' or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by 'comprises . . . a' does not, without more constraints, preclude the existence of additional identical elements in the process, method, article or apparatus that comprises the element. The term "another," as used in this document, is defined as at least a second or more. The terms "includes" and/or "having", as used herein, are defined as comprising. The term 'coupled,' as used herein with reference to electro-optical technology, is defined as connected, although not necessarily directly or mechanically. The term 'program,' as used herein, is defined as a sequence of instructions designed for execution on a computer system. A 'program' or 'computer program' may include a subroutine, a function, a procedure, an object method, an object implementation, an executable application, an applet, a servlet, a source code, an object code, a shared library/dynamic load library and/or other sequence of instructions designed for execution on a computer system.

A method for the bandwidth optimization of at least one sector in a communication network is provided, in accordance with various embodiments of the present invention. The communication network comprises at least one mobile device and a base station controller. The Data Rate Control (DRC) cover value of a first mobile device of at least one mobile device is set for a first sector of the at least one sector. The method includes comparing a number of active users of the first sector with a threshold bandwidth when the DRC of the first sector is in lock for the first mobile device. Further, the method includes searching a second sector of the at least one sector with available bandwidth and a DRC in lock for the first mobile device, when the number of active users of the first sector is greater than the threshold bandwidth. Furthermore, the first mobile device is removed from the first sector and redirected to the second sector when the second sector exists. The DRC cover value of the first mobile device is set for the second sector when the first mobile device is redirected to the second sector.

A method for the bandwidth optimization of at least one sector in a communication network is provided, in accordance with various embodiments of the present invention. The communication network comprises at least one mobile device and a base station controller. The Data Rate Control (DRC) cover value of a first mobile device of at least one mobile device is set for a first sector of the at least one sector. The method includes comparing a number of active users of the first sector with a threshold bandwidth when the DRC of the first sector is in lock for the first mobile device. Further the method includes searching a second sector of the at least one sector with available bandwidth and a DRC in lock for the first mobile device, when the number of active users of the first sector is greater than the threshold bandwidth. Furthermore, the first mobile device is removed from the first sector and redirected to the second sector when the second sector exists. The DRC cover value of the first mobile device is set for the second sector when the first sector is redirected to the second sector. The method also includes comparing the DRC value of the first sector with the DRC value of the second sector when the first mobile is redirected to the second sector. Further, searching of a third sector of the at least one sector, with available bandwidth and a DRC in lock, is done for first mobile device when the DRC value of the second sector is less than the threshold value of the DRC value of the first sector. Then a second mobile device of the at least one mobile device is removed from the first sector when the third sector does not exist.

A base station controller for the bandwidth optimization of at least one sector in a communication network is provided. The communication network comprises at least one mobile device. The Data Rate Control (DRC) cover value of a first mobile device of at least one mobile device is set for a first sector of at least one sector. The base station controller comprises a comparator that is configured to compare the number of active users of the first sector with a threshold bandwidth when the DRC of the first sector is in lock for the first mobile device. The base station controller further includes a processor that is configured to search a second sector of the at least one sector with available bandwidth and a DRC in lock for the first mobile device. The second sector is searched when the number of active users of the first sector is greater than the threshold bandwidth. The processor is also configured to redirect the first mobile device to the second sector when the second sector exists. The first mobile device is then removed from the first sector and the DRC cover value of the first mobile device is set for the second sector.

FIG. 1 illustrates a communication network 100, wherein various embodiments of the present invention can be practiced. The communication network 100 is a wireless communication network that covers a geographic area and includes a base station controller 102, mobile devices 104, 106 and 108, and the Base Transceivers Stations (BTSs) 110, 112 and 114. In the communication network 100, the mobile devices 104, 106 and 108, hereinafter collectively referred to as mobile devices, can communicate and interact with each other. It will be apparent to a person skilled in the art that the communication network 100 can include more or fewer mobile devices and BTSs in different implementations of the invention. However, in this case, the invention will be explained with the help of the mobile devices and BTSs shown in FIG. 1. Examples of the mobile devices include, but are not limited to, cellular phones, Personal Digital Assistants (PDAs) and pagers.

The mobile devices use various wireless technologies such as Code Division Multiple Access (CDMA) and Global System for Mobile (GSM) communication to communicate with each other. The wireless technologies use various communication standards for mobile communication. One commonly used standard is Evolution Data Optimized (EVDO) or Evolution Data (EVDO). EVDO is a telecommunications standard for wireless transmission of data through radio signals. It employs multiplexing techniques such as CDMA and Frequency Division Duplex (FDD). Although various embodiments of the present invention are applicable to EVDO, they can also be applicable to other standards.

The BTSs 110, 112 and 114, hereinafter collectively referred to as BTSs, and the base station controller 102 facilitate the process of communication between the mobile devices. The BTSs are equipments that cover individual geographical areas in the geographic area covered by the communication network 100. The individual geographical area covered by each of the BTSs may be divided into smaller regions that are referred to as sectors. Therefore, each BTS can cover one or more sectors, where each sector is marked by a unique identifier. This unique identifier can be a unique name or alphanumeric key that is assigned to each of the sectors. The base station controller 102 is a central unit that controls and monitors the BTSs and the mobile devices. The BTS 110 can receive data from a mobile device and transmit the data to another mobile device, thereby enabling the two mobile devices to communicate with each other. When the mobile device 106 wants to communicate with the mobile device 104, the mobile device 106 can select the BTS 110 to transmit and receive data from the mobile device 104. The decision made by the mobile device 106 to select the BTS 110 is facilitated by the base station controller 102.

For one embodiment of the present invention, the mobile device 106 can be served by the base station 110 when it is present in the coverage area of a sector of the base station 110. However, there can be more than one mobile device present in the coverage area of the sector. For example, both the mobile devices 104 and 106 may be present in the coverage area of a single sector of the BTS 110. Further, there can be more than one sector present in the geographical vicinity of the mobile device 106 that are capable of serving the mobile device 106. For example, the BTS 110 and the BTS 112 can include sectors that are located in the geographical vicinity of the mobile device 106 and are capable of serving the mobile device 106. The sectors that are capable of serving the mobile device 106 form an active set. The active set is a set of sectors that can serve the mobile device 106 whenever it wants to communicate with other mobile devices. For example, the active set of the mobile device 106 can include a first sector, a second sector and a third sector. For one embodiment of the present invention, the first and second sector can be covered by the BTS 110. For another embodiment of the present invention, the third sector can be covered by the BTS 112.

When the mobile device 106 wants to communicate with another mobile device such as the mobile device 104, the mobile device 106 selects a sector such as a first sector to establish a communication link with the BTS 110. As discussed above, the selection of the first sector is facilitated by the base station controller 102. The selection of the first sector is a dynamic process and is based on the various control parameters of the Data Rate Control (DRC) channel of the communication links between the mobile device 106 and the sectors of the active set.

For a communication link between the mobile device 106 and the first sector, the DRC channel of the communication link is a medium that is used to define the control parameters of the communication link. Each communication link has a reverse link and a forward link. The forward link is used to transfer data from the BTS 110 to the mobile device 106. The reverse link is used to transfer data from the mobile device 106 to the BTS 110. For one embodiment of the present invention, the reverse link is used to set the DRC cover value of the mobile device 106 for the first sector, to make a request for the DRC value of the first sector. The DRC cover is a component of the DRC channel, which informs the BTS 110 that the mobile device 106 has selected the first sector to make a request for the DRC value. The DRC value of the first sector is the second component of the DRC channel and is a measure of the strength of the forward link of the BTS 110. The strength of the forward link is the data rate that can be supported by the current Radio Frequency (RF) conditions of the BTS 110.

The first, second and third sectors of the active set continuously send a DRC lock bit of their respective DRC channels to the mobile device 106. The DRC lock bit of a sector is a parameter that provides information about whether the sector is able to decode the reverse link of the mobile device 106 adequately. The mobile device 106 continuously moves from one location to another. Therefore, the first sector may be able to decode the reverse link of the mobile device 106 at a time instant. Further, the first sector may not be able to hear the mobile device 106 at another time instant. Therefore, the first sector may send different DRC lock bits for the mobile device 106 at different time instants. The value of the DRC lock bit can be either zero or one.

When the first sector sends the value of the DRC lock bit as one (1), hereinafter referred to as the first value, the first sector is able to decode the reverse link adequately. Further, when the DRC lock bit of the first sector has the first value, the DRC of the first sector is said to be in lock for the mobile device 106. When the first sector sends the value of the DRC lock bit as zero (0), hereinafter referred to as the second value, the first sector is unable to decode the reverse link of the mobile device 106. Hence, the DRC of the first sector is not in lock for the mobile device 106. Therefore, the first sector that sends the DRC lock bit as the second value can be rejected by the mobile device 106, to establish a communication link.

The base station controller 102 can take into consideration the threshold bandwidth and the number of active users of the first sector when the mobile device 106 selects the first sector. The threshold bandwidth is the maximum number of active users the first sector can serve at a given time. In other words, the threshold bandwidth is the maximum number of mobile devices that can be served by the first sector. The base station controller 102 affects the decision of the mobile device 106 to select a sector on the basis of the control parameters of the DRC channel, the number of active users, and the threshold bandwidth of the sector, thereby optimizing the bandwidth and facilitating load-balancing of the sectors in the communication network 100. The functions and various components of the base station controller 102 are elaborated on the FIG. 2

Figure 2:
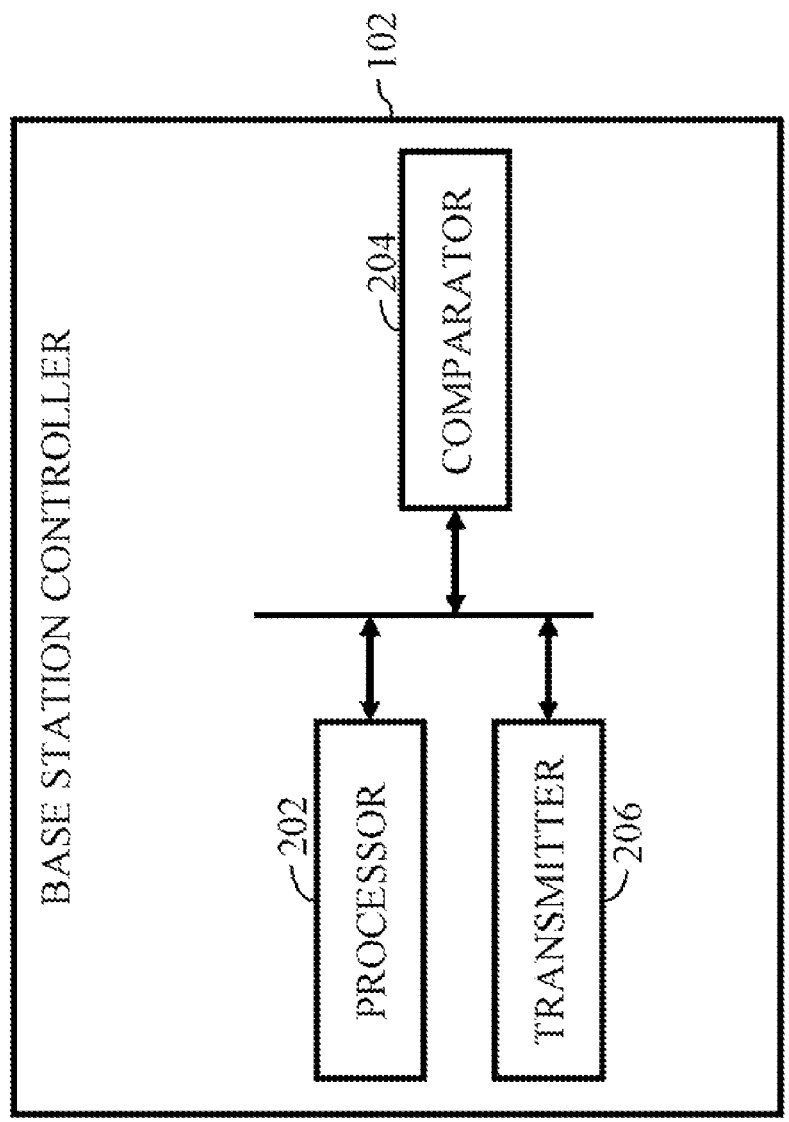
FIG. 2 illustrates the various system elements of a base station controller, in accordance with various embodiments of the present invention.

FIG. 2 illustrates the various system elements of the base station controller 102, in accordance with the various embodiments of the present invention. The base station controller 102 comprises a processor 202, a comparator 204 and a transmitter 206. The processor 202 is configured to search one of the first, second and third sectors when the mobile device 106 wants to communicate with the mobile device 104. The processor 202 is also configured to redirect the mobile device 106 from a current sector such as the first sector to a new sector such as the second sector. The processor 202 redirects the mobile device 106 when the first sector is overloaded or does not provide adequate signal strength.

The comparator 204 is configured to compare the number of active users of a sector with the threshold bandwidth of the sector. The comparator 204 is also configured to compare the DRC values of two sectors. The comparison of the DRC values of the two sectors is also known as DRC sharing. For one embodiment of the present invention, if the mobile device 106 has made a request for the DRC values of the two sectors on the corresponding reverse links, then the comparator 204 can compare the corresponding DRC values. The sector with the higher DRC value is preferred to serve the mobile device 106.

The transmitter 206 is configured to transmit the DRC lock bit of one of the first, second and third sectors to the mobile device 106. The transmitter 206 can send the DRC lock bit of a sector on the basis of the DRC value and threshold bandwidth of the sector. This implies that the transmitter 206 can send the DRC lock bit of the sector on the basis of RF conditions and the available bandwidth of the sector.

Generally, when the mobile device 106 wants to communicate with the mobile device 104, the mobile device 106 makes a request for the DRC values of the first, second and third sectors on the corresponding reverse links. As mentioned above, the sector that has the highest DRC value and the DRC in lock for the mobile device 106 should serve the mobile device 106. For one embodiment of the present invention, the first sector has the highest DRC value and has the DRC in lock for the mobile device 106. Therefore, the mobile device 106 can select the first sector to establish a communication link. Once the mobile device 106 has selected the first sector, the mobile device 106 can set its DRC cover value for the first sector. Further, the mobile device 106 can establish the communication link with the BTS 110, since the first sector is covered by the BTS 110.

The base station controller 102 can verify the choice of the mobile device 106 by checking whether the bandwidth of the first sector is properly optimized. When the number of active users served by the first sector is greater than the threshold bandwidth, the first sector is overloaded and the bandwidth is not optimized. As a result, a low bandwidth is provided to a user of the mobile device 106. Low bandwidth availability results in the low data throughput of the forward link of the first sector. The mobile device 106 can then be directed to search for other sectors when the bandwidth of the first sector is not properly optimized, thereby facilitating bandwidth optimization and uniform distribution of load on the sectors in the communication network 100. The method of bandwidth optimization of the first sector in the communication network 100 is provided in detail in the FIG. 3.

Figure 3:
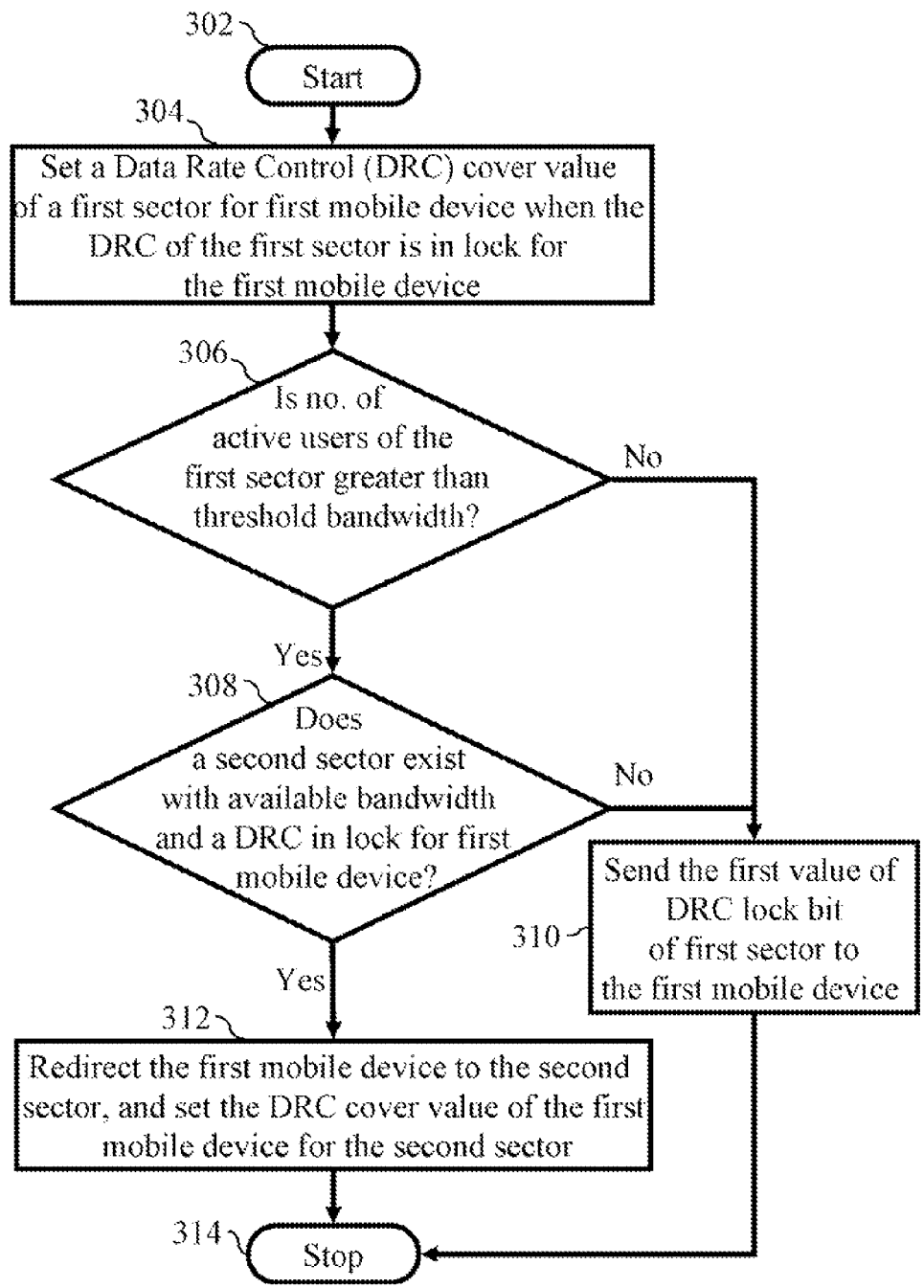
FIG. 3 is a flow diagram illustrating a method for bandwidth optimization in a communication network, in accordance with various embodiments of the present invention.

FIG. 3 is a flow diagram illustrating a method for bandwidth optimization of the first sector, in accordance with the various embodiments of the present invention. The method initiates at step 302. As mentioned above, the first sector is preferred to serve the mobile device 106, hereinafter referred to as the first mobile device, on the basis of the highest DRC value. When the DRC of the first sector is found to be in lock for the first mobile device, the first mobile device selects the first sector. As a result, the DRC cover value of the first mobile device is set for the first sector at step 304. The first sector provides adequate signal strength to the first mobile device. Further, at step 306, the comparator 204 compares the number of active users of the first sector with the threshold bandwidth of the first sector. When the number of active users is less than the threshold bandwidth of the first sector, the first sector is not overloaded and the bandwidth of the first sector is said to be optimized. This bandwidth optimization results in the high data throughput of the forward link of the sector. As a result, a user of the first mobile device experiences an enhanced performance. Therefore, it can be concluded that the first mobile device has taken the correct decision in selecting the first sector. As a result, the transmitter 206 transmits the first value of the DRC lock bit of the first sector to the first mobile device at step 310. When the first mobile device receives the first value of the DRC lock bit, it can establish the communication link with the BTS 110. Thereafter, the first mobile device can be served by the first sector.

When the number of active users is greater than the threshold bandwidth, the first sector is overloaded. Therefore, the bandwidth of the first sector is not properly optimized. As a result, at step 308, the processor 202 can search the second sector with available bandwidth and has the DRC in lock for the first mobile device. The bandwidth of the second sector is available when the number of active users of the second sector is less than the threshold bandwidth of the second sector. When the DRC of the second sector is in lock for the first mobile device, the second sector is able to decode the reverse link of the first mobile device adequately and is capable of serving the first mobile device. However, when the first sector is overloaded, the first mobile device needs to be removed from the first sector and redirected to the second sector. When the second sector exists, the first mobile device rejects the first sector. At step 312, the processor 202 redirects the first mobile device to the second sector. Further, the DRC cover value of the first mobile device is set for the second sector. The removal of the first mobile device from the first sector reduces the load on the first sector, thereby resulting in bandwidth optimization of the first sector.

When the second sector does not exist, the transmitter 206 transmits the first value of the DRC lock bit to the first mobile device at step 310. This implies that the first mobile device does not have any option but to be served by the first sector only. The process of transmitting the first value of the DRC lock bit after searching the second sector provides feedback to the first mobile device. This feedback includes informing the first mobile device about the presence/absence of the second sector. After receiving the first value of the DRC lock bit, the first mobile device can establish the communication link with the first sector. Thereafter, the first mobile device can be served by the first sector.

For one embodiment of the present invention, the method described above enables bandwidth optimization of the first sector. However, the method can be extended to determine whether the second sector is able to provide adequate signal strength to the first mobile device. When the second sector is unable to provide the adequate signal strength, the first mobile device searches for a new sector, hereinafter referred to as a third sector, instead of going back to the first sector. Consequently, the process of searching for the third sector results in bandwidth optimization of the first sector. The method for determining the suitability of the second sector, to enable the bandwidth optimization of the first sector, is described in detail with reference to FIGS. 4 and 5.

Figure 4:
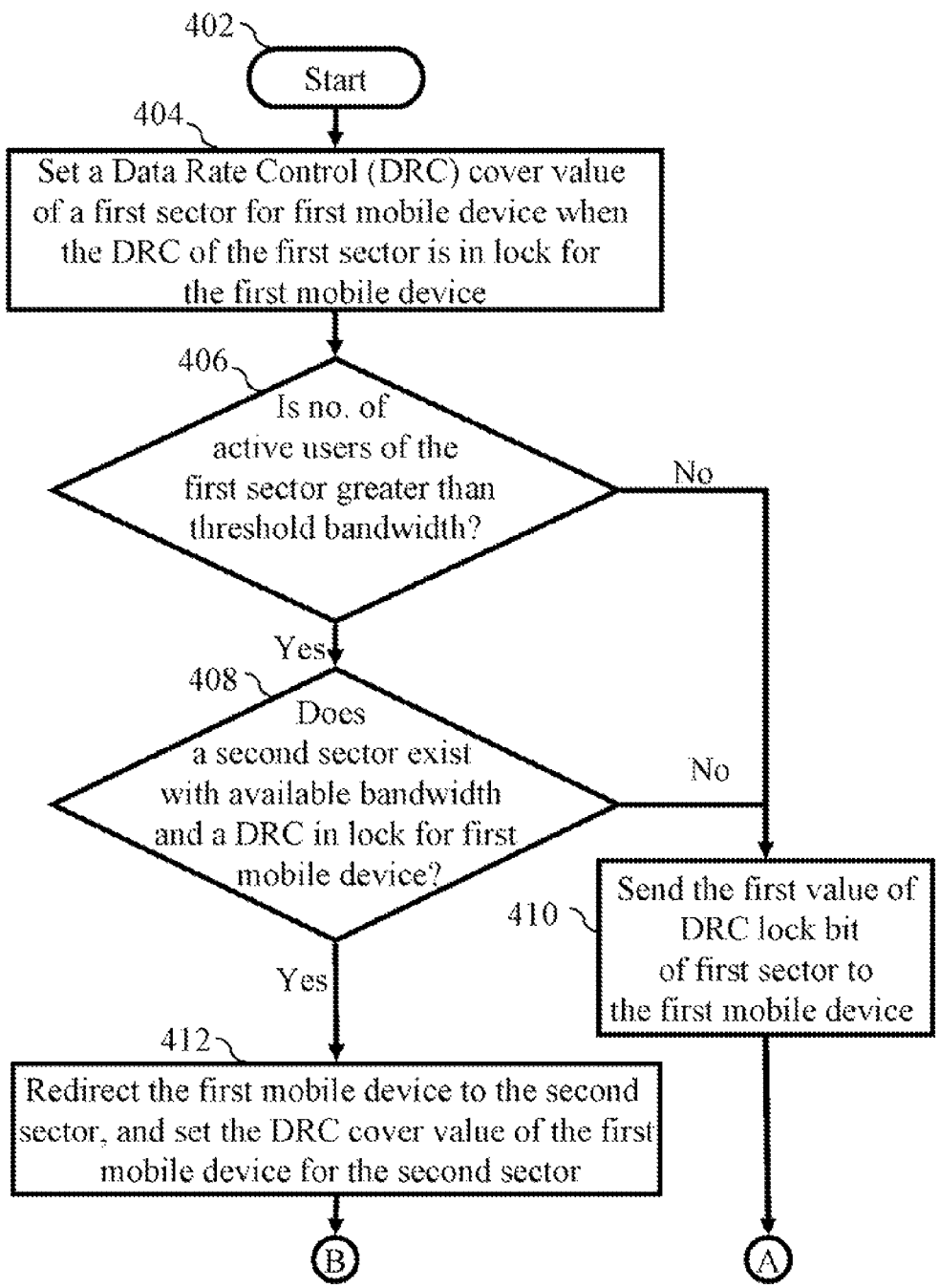
FIGS. 4 and 5 illustrate a flow diagram illustrating another method of bandwidth optimization in a communication network, in accordance with various embodiments of the present invention.
Figure 5:
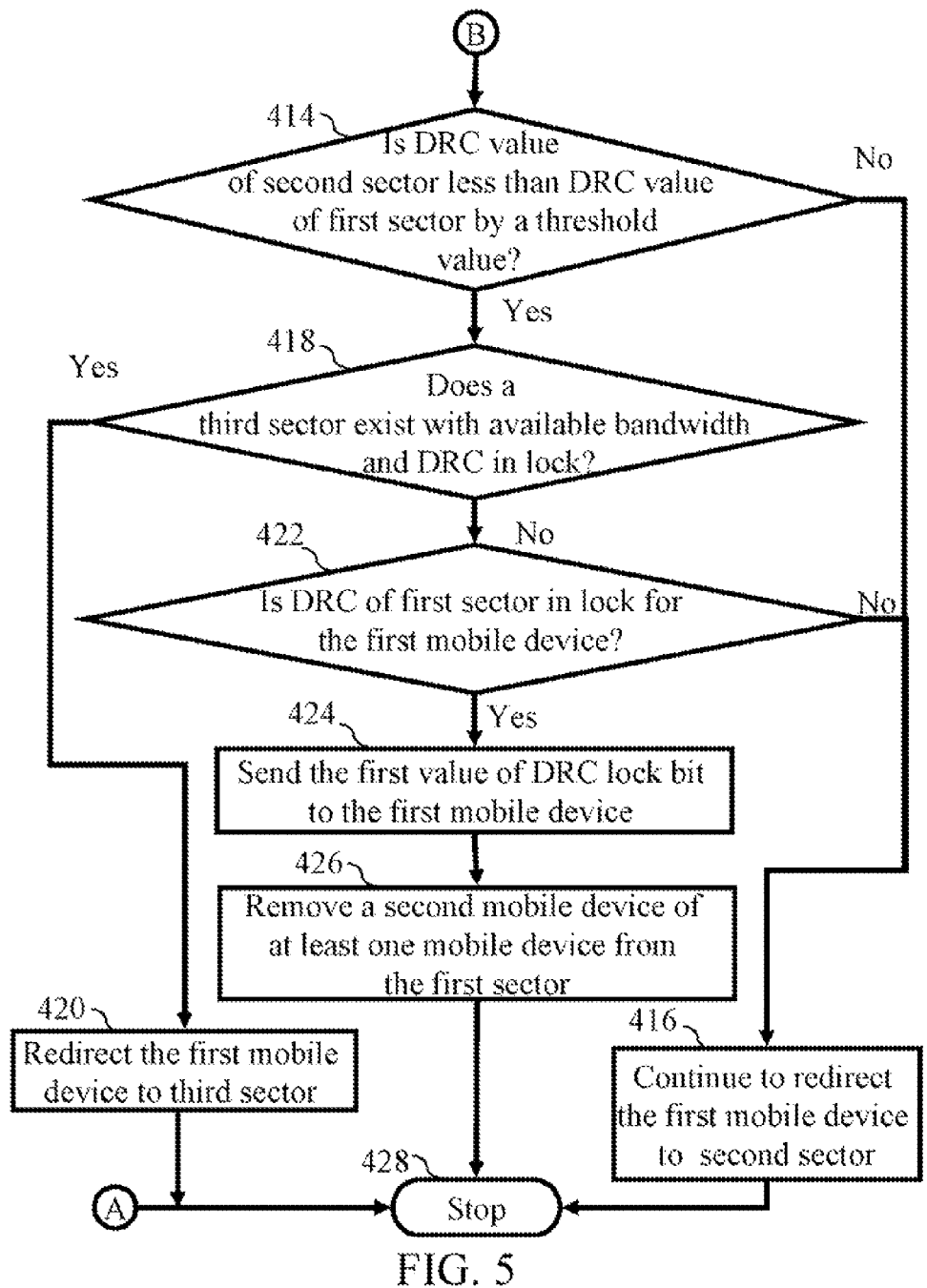

FIGS. 4 and 5 illustrate a flow diagram illustrating another method for bandwidth optimization of the first sector in the communication network 100. The method described in FIGS. 4 and 5 is an extension of the method described in FIG. 3 and initiates at step 402. The steps 404, 406, 408, 410 and 412 are similar to the steps 304, 306, 308, 310 and 312, respectively, of FIG. 3. As mentioned above, the first mobile device is redirected to the second sector at step 412. The DRC cover value of the first mobile device is set for the second sector. At step 414, the comparator 204 compares the DRC value of the second sector with the DRC value of the first sector. The comparator 204 checks whether the DRC value of the second sector is less than the DRC value of the first sector by a threshold value. The threshold value can be a pre-defined numeric value which indicates the relative signal strength of the first and second sector. For one embodiment, the pre-defined numeric value can be set by the base station controller 102. When the DRC value of the second sector is greater than the DRC value of the first sector by the threshold value, this implies that the second sector is able to provide adequate signal strength to the first mobile device. Therefore, the processor 202 continues to redirect the first mobile device to the second sector at step 416.

When the DRC value of the second sector is less than the DRC value of the first sector by the threshold value, the signal strength provided by the second sector can be substantially less as compared to the signal strength provided by the first sector. Therefore, the second sector cannot provide adequate signal strength to the first mobile device. As a result, at step 418, the processor 202 searches for the third sector that has an available bandwidth and the DRC in lock for the first mobile device. The third sector is a sector from the active set that can hear the first mobile device and has an available bandwidth. It may not have been selected earlier in place of the first and second sectors either due to either low signal strength or bandwidth unavailability. When the third sector exists, the processor 202 redirects the first mobile device to the third sector at step 420. Thereafter, the DRC cover value of the first mobile device is set for the third sector and the first mobile device is removed from the first sector, enabling bandwidth optimization of the first sector.

There may be a possibility that the third sector does not exist. When the third sector does not exist and the second sector does not provide adequate signal strength to the first mobile device, the processor 202 can again consider the first sector. At step 422, the processor 202 checks whether the DRC of the first sector is in lock for the first mobile device. When the DRC of the first sector is not in lock for the first mobile device, this implies that the first sector is unable to decode the reverse link of the first mobile device adequately. Therefore, the first mobile device does not have an option and continues to be served by the second sector.

When the DRC of the first sector is in lock for the first mobile device, the transmitter 206 transmits the first value of the DRC lock bit of the first sector to the first mobile device at step 424. The first value of the DRC lock bit of the first sector implies that the first sector is ready to serve the first mobile device. As mentioned above, the first sector was initially rejected by the first mobile device as the first sector was overloaded. However, due to the unavailability of suitable second and third sectors, the first mobile device is only left with the option of the first sector.

At step 426, the processor 202 can search for a second mobile device, such as the mobile device 104, which can be removed from the first sector. The second mobile device can be searched to reduce the number of active users of the first sector. For one embodiment of the present invention, the method explained in FIGS. 3, 4, and 5 for the first mobile device can also be applied to the second mobile device. As mentioned above, the first mobile device searched for an alternative to the first sector when the first sector was overloaded. Similarly, the second mobile device can search for a suitable alternative to the first sector, e.g., the second sector. When the second sector exists, the second mobile device is removed from the first sector and redirected to the second sector. For another embodiment of the present invention, when the second mobile device is unable to find a suitable alternative sector, another mobile device such as a mobile device 108 can be removed from the first sector to reduce the load on the first sector. This process continues till at least one mobile device is shifted from the first sector to reduce the load on the first sector, resulting in bandwidth optimization of the first sector.

Various embodiments of the present invention have significant advantages over the methods and systems that existed earlier. The present invention increases the efficiency of bandwidth usage in a communication network, since it influences the decision of a mobile about which sector it will select in a switched sector technology such as EVDO. The method described in the present invention enables infrastructure such as a base-station controller to influence the decision of the mobile device to select a sector, based on Radio Frequency (RF) conditions and the available sector bandwidth. The present invention enhances the end user's experience by providing optimized throughput of data at any given time. Moreover, the present invention makes use of system-level information pertaining to various sectors, e.g., the DRC parameters to more evenly distribute the sector load. Furthermore, the present invention incorporates a feedback mechanism to ensure that the throughput performance for the end user is not negatively impacted. To ensure this, the mobile device is not removed from its current sector until a suitable alternative sector is found for the device. The present invention also maximizes operator investment by enabling more traffic to be carried on a given number of carriers, without the need of adding additional carrier resources.

What is claimed is:

1. A method for bandwidth optimization of at least one sector in a communication network, the communication network comprising at least one mobile device and a base station controller, wherein a Data Rate Control (DRC) cover value of a first mobile device of at least one mobile device is set for a first sector of the at least one sector, the method comprising the steps of:
   comparing a number of active users of the first sector with a threshold bandwidth when a DRC of the first sector is in lock for the first mobile device;
   searching a second sector of the at least one sector with available bandwidth and a DRC in lock for the first mobile device, when the number of active users of the first sector is greater than the threshold bandwidth; and
   redirecting the first mobile device to the second sector when the second sector exists, wherein the first mobile device is removed from the first sector, further wherein the DRC cover value of the first mobile device is set for the second sector.

2. The method as recited in claim 1 further comprising the step of sending a first value of the DRC lock bit of the first sector to the first mobile device when the number of active users of the first sector is less than the threshold bandwidth, wherein the first mobile device is served by the first sector when the first value of the DRC lock bit is received.

3. The method as recited in claim 1 further comprising the step of sending a first value of the DRC lock bit of the first sector to the first mobile device when the second sector does not exist, wherein the first mobile device is served by the first sector when the first value of the DRC lock is received.

4. The method as recited in claim 1 further comprising the step of sending a second value of the DRC lock bit of the first sector to the first mobile device when the second sector exists.

5. The method as recited in claim 1 further comprising the steps of:
   comparing a DRC value of the first sector with a DRC value of the second sector when the first mobile is redirected to the second sector;
   searching a third sector of the at least one sector with available bandwidth and a DRC in lock for the first mobile device, when the DRC value of the second sector is less than the DRC value of the first sector by a threshold value; and
   removing a second mobile device of the at least one mobile device from the first sector when the third sector does not exist.

6. The method as recited in claim 5 further comprising the steps of:
   checking if the DRC of the first sector is in lock for the first mobile device when the third sector does not exist; and
   sending the first value of the DRC lock bit of the first sector to the first mobile device when the DRC of the first sector is in lock for the first mobile device.

7. The method as recited in claim 6, wherein the first mobile device is redirected to the second sector when the DRC of the first sector is not in lock for the first mobile device.

8. The method as recited in claim 5 further comprising the step of redirecting the first mobile device to the third sector when the third sector exists, wherein the DRC cover value of the first mobile device is set for the third sector when the first mobile device is redirected to the third sector.

9. A method for bandwidth optimization of at least one sector in a communication network, the communication network comprising at least one mobile device and a base station controller, wherein a Data Rate Control (DRC) cover value of a first mobile device of at least one mobile device is set for a first sector of the at least one sector, the method comprising the steps of:
   comparing a number of active users of the first sector with a threshold bandwidth when a DRC of the first sector is in lock for the first mobile device;
   searching a second sector of the at least one sector with available bandwidth and a DRC in lock for the first mobile device, when the number of active users of the first sector is greater than the threshold bandwidth;
   redirecting the first mobile device to the second sector when the second sector exists, wherein the first mobile device removed from the first sector, further wherein the DRC cover value of the first mobile device is set for the second sector;
   comparing a DRC value of the first sector with a DRC value of the second sector when the first mobile is redirected to the second sector;
   searching a third sector of the at least one sector with available bandwidth and a DRC in lock for the first mobile device, when the DRC value of the second sector is less than the DRC value of the first sector by a threshold value; and
   removing a second mobile device of the at least one mobile device from the first sector when the third sector does not exist.

10. The method as recited in claim 9 further comprising the step of sending a first value of the DRC lock bit of the first sector to the first mobile device when the number of active users of the first sector is less than the threshold bandwidth, wherein the first mobile device is served by the first sector when the first value of the DRC lock bit is received.

11. The method as recited in claim 9 further comprising the step of sending a first value of the DRC lock bit of the first sector to the first mobile device when the second sector does not exist, wherein the first mobile device is served by the first sector when the first value of the DRC lock bit is received.

12. The method as recited in claim 9 further comprising the step of sending a second value of the DRC lock bit of the first sector to the first mobile device when the second sector exists.

13. The method as recited in claim 9 further comprising the steps of:

checking if the DRC of the first sector is in lock for the first mobile device when the third sector does not exist; and sending a first value of the DRC lock bit of the first sector to the first mobile device, when the DRC of the first sector is in lock for the first mobile device.

14. The method as recited in claim 13, wherein the first mobile device is redirected to the second sector when the DRC of the first sector is not in lock for the first mobile device.

15. The method as recited in claim 9 further comprising the step of redirecting the first mobile device to the third sector when the third sector exists, wherein the DRC cover value of the first mobile device is set for the third sector when the first mobile device is redirected to the third sector.

16. A base station controller for bandwidth optimization of at least one sector in a communication network, the communication network comprising at least one mobile device, wherein a Data Rate Control (DRC) cover value of a first mobile device of at least one mobile device is set for a first sector of at least one sector, the base station controller comprising:

a comparator configured to:
compare a number of active users of the first sector with a threshold bandwidth when a DRC of the first sector is in lock for the first mobile device; and a processor configured to:
search a second sector of the at least one sector with available bandwidth and a DRC in lock for the first mobile device, wherein the second sector is searched when the number of active users of the first sector is greater than the threshold bandwidth; and redirect the first mobile device to the second sector when the second sector exists, wherein the first mobile device is removed from the first sector, further wherein the DRC cover value of the first mobile device is set for the second sector.

17. The base station controller as recited in claim 16 further comprising a transmitter configured to:

send a first value of the DRC lock bit of the first sector to the first mobile device when the number of active users of the first sector is less than the threshold bandwidth, wherein the first mobile device is served by the first sector when the first value of the DRC lock bit is received;

send the first value of the DRC lock bit of the first sector to the first mobile device when the second sector does not exist, wherein the first mobile device is served by the first sector when the first value of the DRC lock bit is received;

send a second value of the DRC lock bit of the first sector to the first mobile device when the second sector exists; and send the first value of the DRC lock bit of the first sector to the first mobile device, when the third sector does not exist and the DRC of the first sector is in lock for the first mobile device.

18. The base station controller as recited in claim 16, wherein the comparator is further configured to compare a DRC value of the first sector with a DRC value of a second sector when the first mobile is redirected to the second sector.

19. The base station controller as recited in claim 16, wherein the processor is further configured to:

search a third sector of the at least one sector with available bandwidth and a DRC in lock for the first mobile device, when the DRC value of the second sector is less than the DRC value of the first sector by a threshold value;

redirect the first mobile device to the third sector when the third sector exists, wherein the DRC cover value of first mobile device is set for the third sector;

check if the DRC of the first sector is in lock for the first mobile device when the third sector does not exist; and remove a second mobile device of the at least one mobile device from the first sector when the third sector does not exist.

* * * * *